United States Patent
Schmidt et al.

(10) Patent No.: US 7,644,633 B2
(45) Date of Patent: Jan. 12, 2010

(54) VORTEX FLOWMETER WITH TEMPERATURE COMPENSATION

(75) Inventors: Eric C. Schmidt, Mound, MN (US); Jeffry D. Foster, St. Louis Park, MN (US)

(73) Assignee: Rosemount Inc., Eden Prairie, MN (US)

( * ) Notice: Subject to any disclaimer, the term of this patent is extended or adjusted under 35 U.S.C. 154(b) by 35 days.

(21) Appl. No.: 11/847,732

(22) Filed: Aug. 30, 2007

(65) Prior Publication Data

US 2008/0141769 A1 Jun. 19, 2008

Related U.S. Application Data

(60) Provisional application No. 60/875,498, filed on Dec. 18, 2006.

(51) Int. Cl.
*G01F 1/32* (2006.01)
(52) U.S. Cl. .................................................. 73/861.22
(58) Field of Classification Search .............. 73/861.22
See application file for complete search history.

(56) References Cited

U.S. PATENT DOCUMENTS

| | | | | |
|---|---|---|---|---|
| 4,455,877 | A | | 6/1984 | Blechinger et al. ........ 73/861.22 |
| 4,876,897 | A | * | 10/1989 | DeCarlo et al. ........... 73/861.04 |
| 4,984,456 | A | * | 1/1991 | Takahashi ................. 73/114.35 |
| 5,218,857 | A | * | 6/1993 | Decker et al. .............. 73/23.31 |
| 5,453,944 | A | * | 9/1995 | Baumoel ...................... 703/2 |
| 5,837,903 | A | * | 11/1998 | Weigand ................... 73/861.42 |
| 6,170,338 | B1 | * | 1/2001 | Kleven et al. ............. 73/861.22 |
| 6,405,577 | B2 | * | 6/2002 | Hanashiro et al. .......... 73/23.31 |
| 6,412,353 | B1 | * | 7/2002 | Kleven et al. ............. 73/861.22 |
| 6,484,590 | B1 | * | 11/2002 | Kleven et al. ............. 73/861.22 |
| 6,611,785 | B1 | * | 8/2003 | Yamanaka et al. ........ 73/861.12 |
| 6,651,512 | B1 | * | 11/2003 | Kleven et al. ............. 73/861.22 |
| 6,658,945 | B1 | * | 12/2003 | Kleven ..................... 73/861.22 |
| 7,258,024 | B2 | * | 8/2007 | Dimarco et al. ........... 73/861.22 |

FOREIGN PATENT DOCUMENTS

EP 0 200 563 A2 11/1986

OTHER PUBLICATIONS

"Notification of Transmittal of Search Report and Written Opinion" for PCT/US2007/024856.
Rosemount 8800C Series Vortex Flowmeter, Product Data Sheet 00813-0100-4003, Rev NA, Catalog 2006-2007; Hart® and Foundation™ Fieldbus Protocols, 6 pages.

* cited by examiner

*Primary Examiner*—Harshad Patel
(74) *Attorney, Agent, or Firm*—Westman, Champlin & Kelly, P.A.

(57) ABSTRACT

A vortex flowmeter has a vortex sensor and terminals that receive a thermal junction output from a thermowell assembly that is remote from the vortex flowmeter. The vortex flowmeter has a data input that receives data representing a thermal property of the thermowell assembly. The vortex flowmeter has a circuit that receives the first thermal junction output and the vortex sensor output, and that provides a flowmeter output that is compensated for temperature and for the thermal property.

21 Claims, 7 Drawing Sheets

VORTEX FLOWMETER WITH TEMPERATURE COMPENSATION

CROSS-REFERENCE TO RELATED APPLICATION

The present application is based on and claims the benefit of U.S. provisional patent application Ser. No. 60/875,498, filed Dec. 18, 2006, the content of which is hereby incorporated by reference in its entirety.

BACKGROUND OF THE INVENTION

In industrial process installations, vortex flowmeters are used to measure fluid flow rates through piping systems. The vortex flowmeter includes an electronic transmitter and a vortex meter housing. The vortex meter housing carries the fluid flow and supports a bluff body in the fluid flow. The vortex meter housing is generally cylindrical and fits between flanges in the piping system.

Vortices are generated by fluid flow past the bluff. The occurrence of the vortices is generally proportional to fluid velocity. The vortex frequency is measured by the electronic transmitter and used to calculate a flowmeter output that indicates the flowrate.

A first type of vortex flowmeter (described below in connection with FIG. 1) includes additional sensors for sensing fluid temperature and pressure and is able to calculate mass flow from the vortex frequency, the temperature and the pressure. A second type of vortex flowmeter does not include pressure and temperature sensors and is not capable of calculating mass flow. The second type of vortex flowmeter is generally less costly than the first type of vortex flowmeter. The second type of vortex flowmeter is used primarily in applications where temperature is relatively constant or density is relatively independent of temperature such as liquid flows.

Manufacture of two different types of flowmeters in multiple lines sizes greatly increases the cost and complexity of manufacturing and inventorying vortex flowmeters.

SUMMARY OF THE INVENTION

Disclosed is a vortex flowmeter. The vortex flowmeter comprises a vortex sensor. The vortex sensor senses a flow. The vortex sensor provides a vortex sensor output.

The vortex flowmeter comprises first terminals for receiving a first thermal junction output from a first thermowell assembly that is remote from the vortex flowmeter. The vortex flowmeter comprises a data input for receiving data representing a thermal property of the thermowell assembly.

The vortex flowmeter comprises a circuit. The circuit receives the data. The circuit receives the first thermal junction output. The circuit receives the vortex sensor output. The circuit provides a flowmeter output. The flowmeter output is compensated for temperature and for the thermal property.

DETAILED DESCRIPTION OF ILLUSTRATIVE EMBODIMENTS

As illustrated and as used in this application, the term "thermocouple" means a circuit comprising two thermal junctions that are electrically connected together by a first conductor comprising a first material. As used in this application, the term "thermal junction" means a contact between the first material and second material.

In the embodiments described below, a vortex flowmeter connects to a thermal junction in a thermowell assembly at a location that is remote from the vortex flowmeter. The vortex flowmeter receives data representing a thermal property of the thermowell assembly. A circuit in the vortex flowmeter receives an output of the thermal junction and a vortex sensor output. The circuit provides a flowmeter output that is compensated for temperature and that is compensated for the thermal property.

Figure 1:
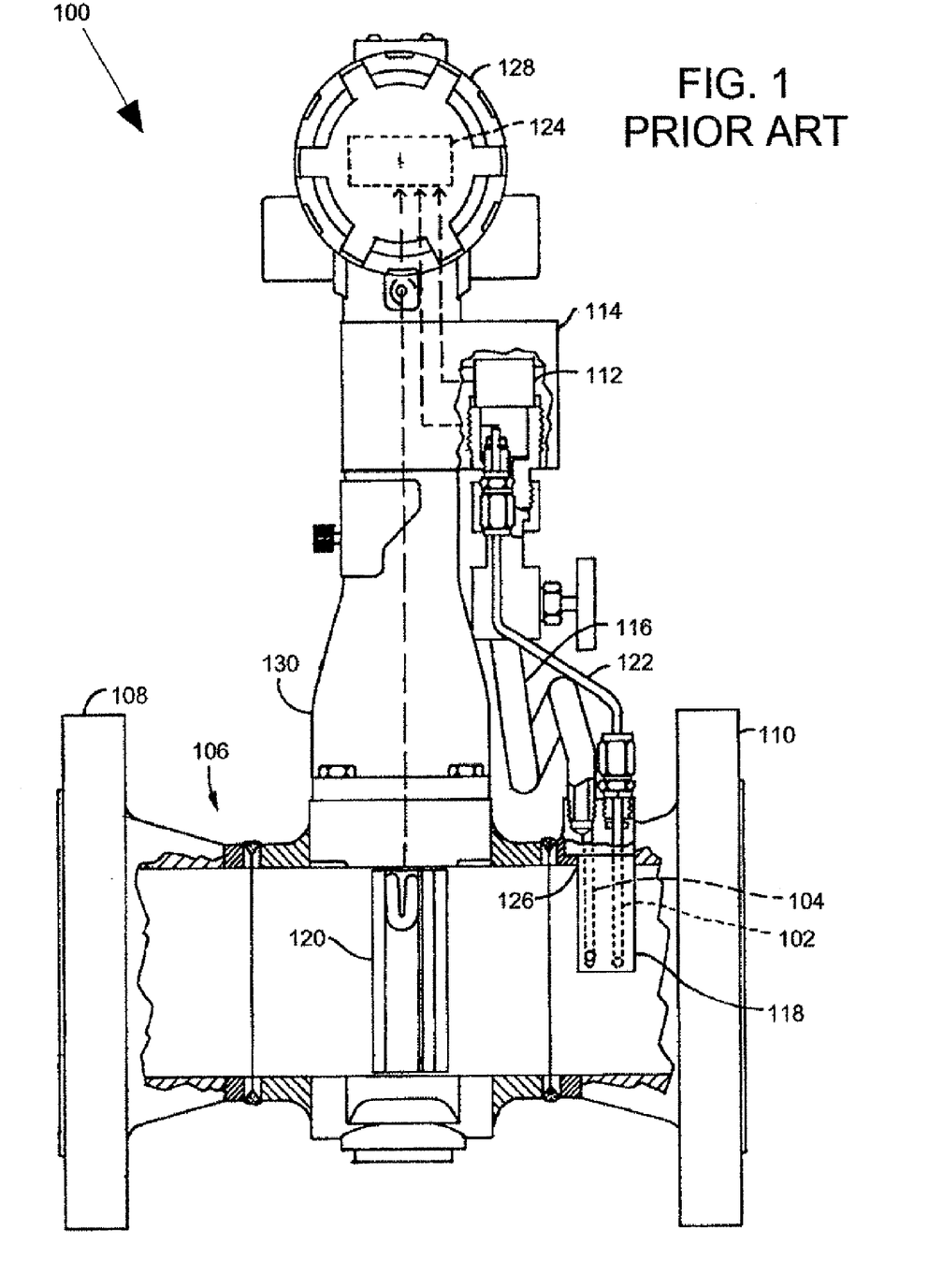
FIG. 1 illustrates a prior art vortex flowmeter.

As illustrated in FIG. 1, a first type of vortex flowmeter includes a sensor for sensing fluid temperature, as disclosed for example in U.S. Pat. No. 6,658,945 Kleven and U.S. Pat. No. 6,170,338 B1 Kleven et al., which are hereby incorporated by reference. FIG. 1 illustrates a first type of prior art vortex flowmeter 100 that includes a temperature sensor 102 and a pressure tap 104 that are mounted to a vortex meter housing 106 between connecting flanges 108 and 110. A pressure sensor 112 in a connecting module 114 is coupled to the pressure tap 104 by a tube 116. The temperature sensor 102 and the pressure tap 104 are mounted in a streamlined body 118 located downstream from a bluff body 120. The streamlined body 118 includes an inner recess for receiving the temperature sensor 102. The streamlined body 118 mounts to the vortex meter housing 106 and extends through a recess 126 in the vortex meter housing 106. A signal line 122 connects the temperature sensor 102 to an electronic transmitter 124 located in a transmitter housing 128. The transmitter housing 128 is mounted on the connecting module 114, the connecting module 114 is mounted on a support tube 130, and the support tube 130 is mounted on the vortex meter housing 106. In applications where the pressure and temperature sensors are not needed, the cost of the vortex flowmeter 100 is increased unnecessarily by machining the recess 126, providing the streamlined body 118 and providing the temperature sensor 102 and the pressure sensor 112.

There is also a desire to provide a vortex flowmeter that has a capability of operation in connection with remote thermowell assemblies to provide a "heat accountability" output that indicates an amount of heat produced or lost in flowing fluid through an energy exchange process. As described below in connection with FIGS. 4-5, 7, 8-14, vortex flowmeters are disclosed that provide such a heat accountability output.

Figure 2:
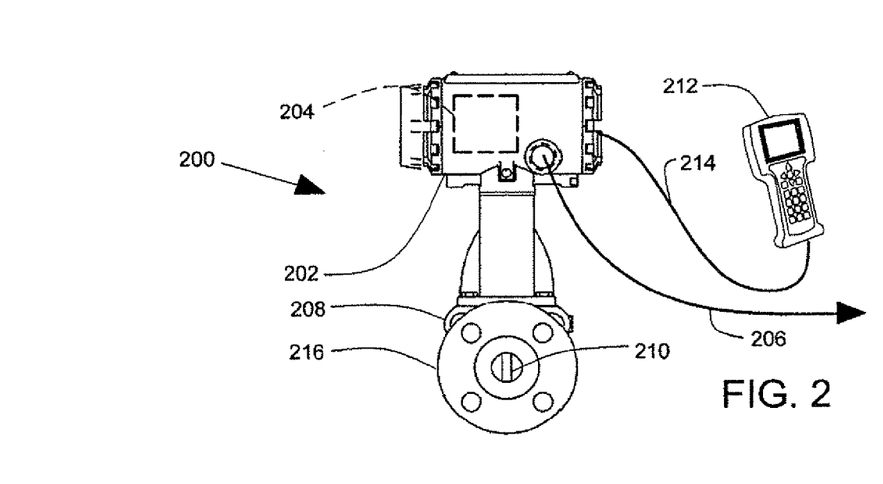
FIGS. 2-3 illustrate a first vortex flowmeter with temperature compensation.

FIG. 2 illustrates a vortex flowmeter 200. The vortex flowmeter 200 comprises a transmitter housing 202. An electronic circuit 204 is enclosed in the transmitter housing 202. The electronic circuit 204 provides a flowmeter output on cable 206. The flowmeter output 206 can be an analog output, a digital output or both. The vortex flowmeter 200 comprises a vortex meter housing 208 that is provided with flanges 216, 218 (FIG. 3) for connection to a piping system. A shedding bar (also called a bluff body) 210 is supported in the vortex meter housing 208. As fluid flows past the shedding bar 210, fluid vortices are shed by the shedding bar 210. A vortex sensor (which can be seen schematically in FIGS. 6 and 7) near the shedding bar 210 senses the vortices. The electronic circuit 204 calculates the flowmeter output 206 as a function of a frequency of vortices sensed by the vortex sensor. A handheld data entry terminal 212 is used at the time of installation to communicate data through the cable 214 to the electronic circuit 204. Data can also be communicated from a control system by way of cable 206. The vortex flowmeter 200 includes a data input that receives the data.

Figure 3:
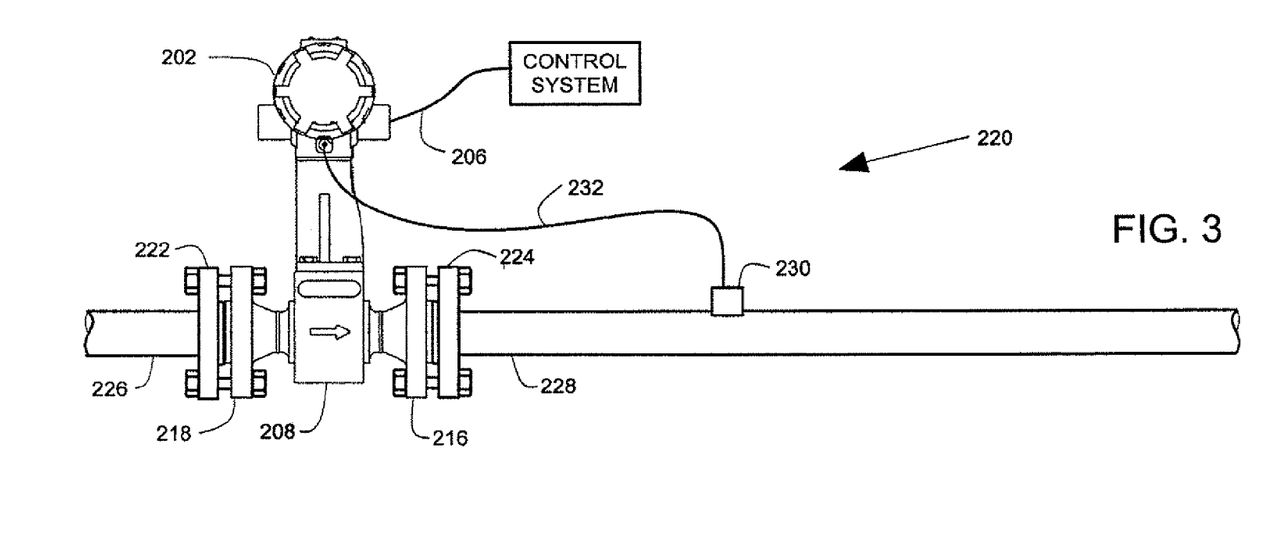

FIG. 3 illustrates a flow measurement installation 220 that includes the vortex flowmeter 200. The flanges 216, 218 are bolted as illustrated to flanges 222, 224 of a fluid piping system 226, 228. Fluid flows through the fluid piping system 226, 228 and the vortex flowmeter 200. The fluid can comprise a liquid or a gas.

A thermowell assembly 230 is connected to the vortex flowmeter 200 by way of an electrical cable 232. The thermowell assembly 230 is remote from the vortex flowmeter 200. The thermowell assembly 230 is mounted to the piping system 226, 228 to sense fluid temperature. The thermowell assembly 230 comprises a thermoelectric junction inside a thermowell. A thermowell is a pressure-tight receptacle adapted to receive a temperature sensing element and provided with a pressure-tight attachment to a pipe or other pressure vessel. The thermowell assembly 230 is described in more detail below by way of examples illustrated in FIGS. 8-13. The electrical cable 232 is described in more detail to below by way of an example illustrated in FIG. 14.

The connection of the vortex flowmeter 200 to the thermowell assembly 230 is optional. In some installation, temperature compensation is not required, and the cost of the installation of a thermowell assembly 230 can be avoided. In other installations, temperature compensation is desired and the thermowell assembly 230 is connected. The same type of vortex flowmeter 200 can be used in both installations. The thermowell assembly 230 can be connected downstream from the vortex flowmeter (as illustrated in FIG. 3) or can alternatively be mounted upstream. The flow measurement installation 220 is described in more detail by way of an exemplary block diagram illustrated in FIG. 6.

Figures 4, 5:
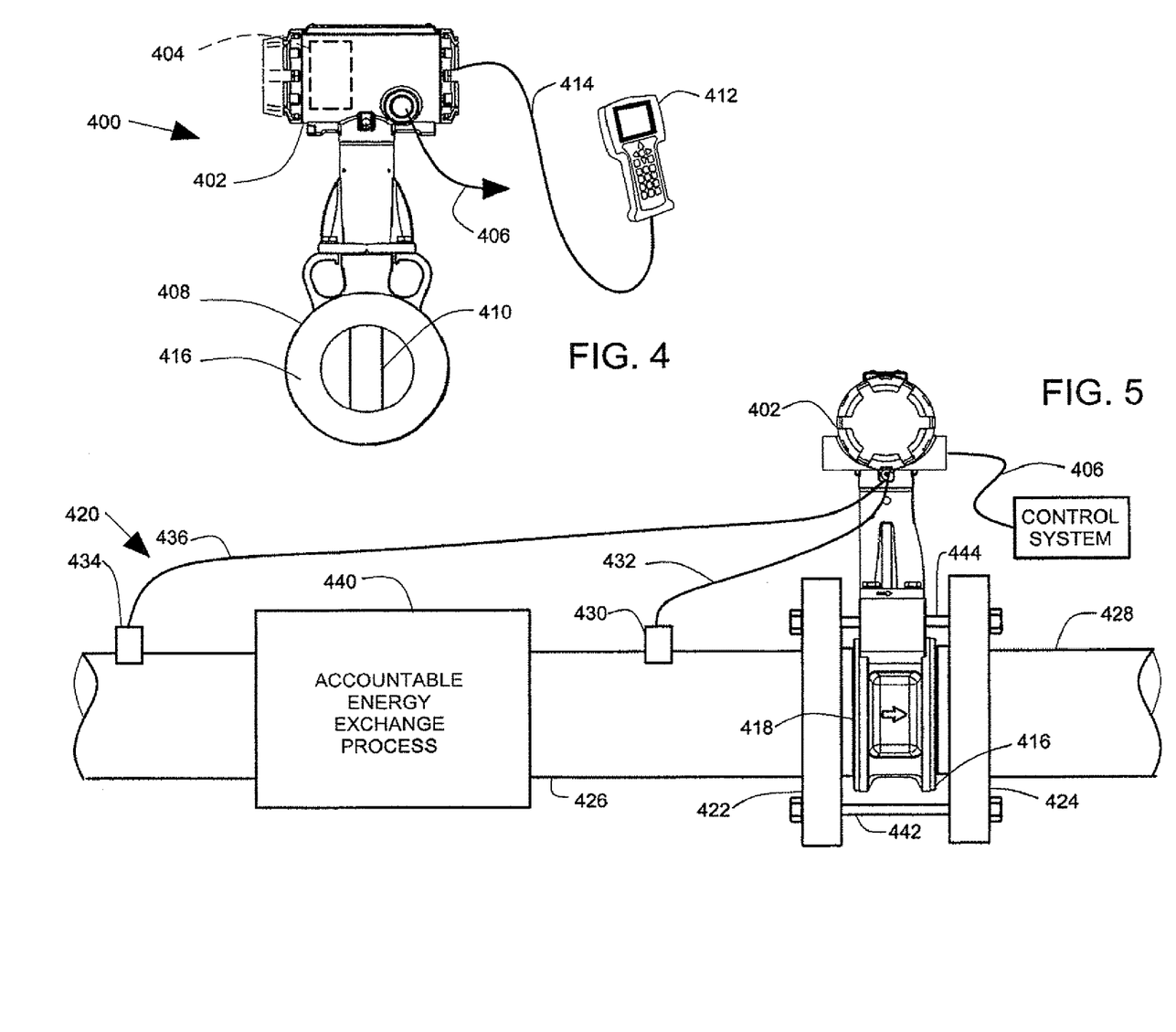
FIG. 4-5 illustrate a second vortex flowmeter with temperature compensation.

FIG. 4 illustrates a vortex flowmeter 400. The vortex flowmeter 400 comprises a transmitter housing 402. An electronic circuit 404 is enclosed in the transmitter housing 402. The electronic circuit 404 provides a flowmeter output on cable 406. The flowmeter output 406 can be an analog output, a digital output or both. The vortex flowmeter 400 comprises a flangeless vortex meter housing 408 that is provided with sealing surfaces 416, 418 (FIG. 5) for sealing to a piping system. A shedding bar (also called a bluff body) 410 is supported in the vortex meter housing 408. As fluid flows past the shedding bar 410, fluid vortices are shed by the shedding bar 410. A vortex sensor (illustrated in FIGS. 6,7) near the shedding bar 410 senses the vortices. The electronic circuit 404 calculates the flowmeter output on cable 406 as a function of a frequency of vortices sensed by the vortex sensor. A handheld data entry terminal 412 is used at the time of installation to communicate data through a cable 414 to the electronic circuit 404. Data can also be communicated from a control system by way of the cable 406. The vortex flowmeter 400 includes a data input that receives the data.

FIG. 5 illustrates a flow measurement installation 420 that includes the flangeless vortex flowmeter 400. The sealing surfaces 416, 418 are sealed as illustrated to flanges 422, 424 of a fluid piping system 426, 428. Long bolts 442, 444 are used to compress the flanges 422, 424 against the sealing surfaces 416, 418. Fluid flows through the fluid piping system 426, 428 and the vortex flowmeter 400. The fluid can comprise a liquid or a gas.

A first thermowell assembly 430 is connected to the vortex flowmeter 400 by way of an electrical cable 432. A second thermowell assembly 434 is connected to the vortex flowmeter 400 by way of an electrical cable 436. The thermowells 430, 434 are mounted to the piping system 426 to sense fluid temperatures. The thermowell assemblies 430, 434 comprise thermoelectric junctions inside thermowells. The thermowell assemblies 430, 434 are described in more detail below by way of examples illustrated in FIGS. 8-13. The electrical cables 432, 436 are described in more detail below by way of an example illustrated in FIG. 14.

The thermowell assembly 434 is installed on the piping system 426 in a position upstream of an energy exchange process 440. The thermowell assembly 430 is installed on the piping system 426 in a position downstream of the energy exchange process 440. The energy exchange process 440 can be any process that either adds or removes energy from the flowing fluid. In one aspect, the energy exchange process 440 comprises a heat exchanger that removes heat from the flowing fluid. In another aspect the energy exchange process 440 comprises a boiler that adds heat to the flowing fluid. The flow measurement installation 420 is described in more detail below by way of an exemplary block diagram illustrated in FIG. 7. Note that although the description of FIG. 5 describes two separate connections to the thermocouples, the thermocouples may also be connected together remotely from the transmitter and both couple to a single pair of input terminals.

Figure 6:
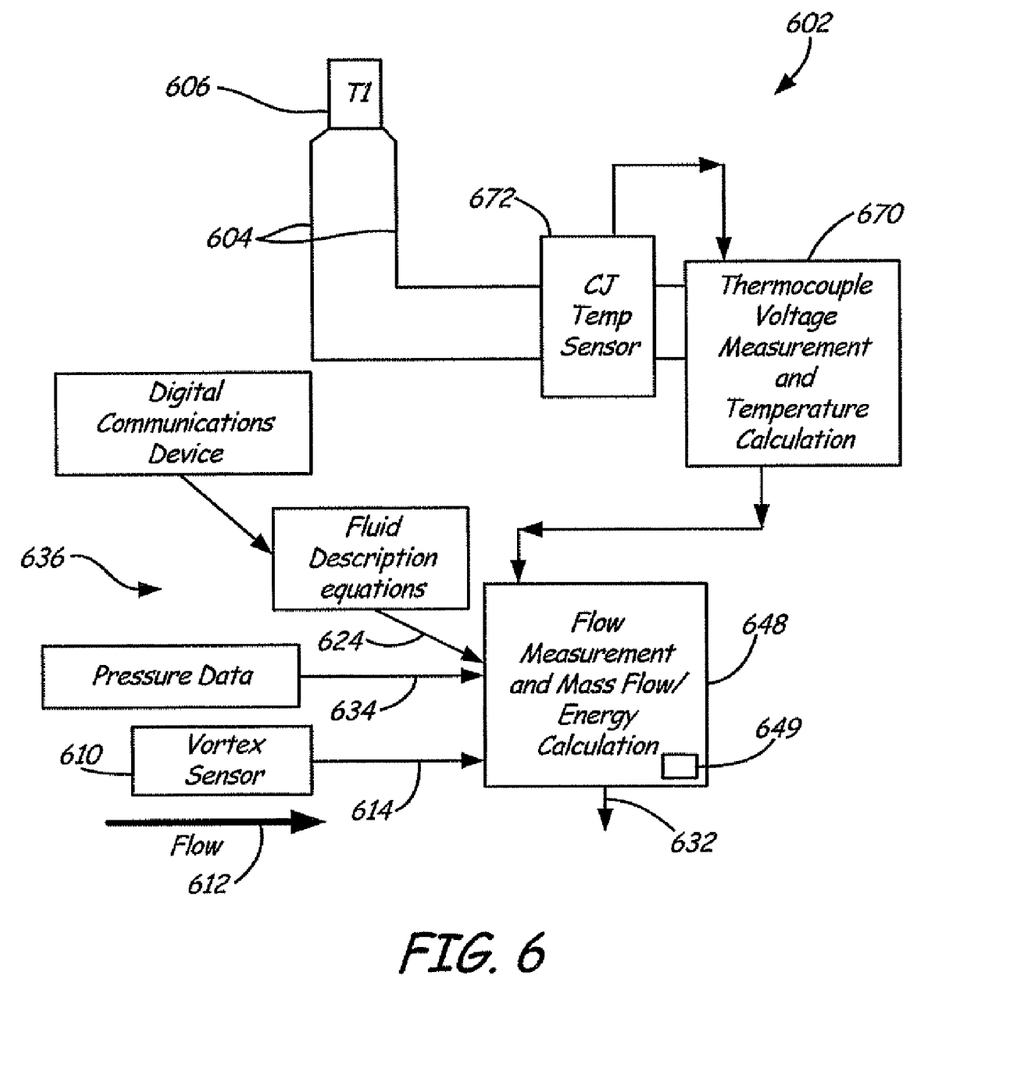
FIG. 6 illustrates a block diagram of a third vortex flowmeter with temperature compensation.

FIG. 6 illustrates a block diagram of a vortex flowmeter 602. The vortex flowmeter 602 is coupled by a cable 604 to a first thermojunction (Tf) 606 that is mounted in a first thermowell 608. The first thermojunction 606 is remote from the vortex flowmeter 602, for example, as illustrated in FIG. 3. The first thermal junction 606 senses a temperature T1 of fluid that flows through the vortex flowmeter 602 and that flows past the thermojunction 606. The cable 604 couples to thermocouple voltage measurement and temperature calculation circuitry 670 to a cold junction temperature sensor 672. Thermocouple voltage measurement and temperature calculation circuitry 670 is configured to provide an output to circuitry 648 related to the temperature of the thermocouple 606.

The vortex flowmeter 602 comprises a vortex sensor 610. The vortex sensor 610 is mounted on or adjacent to a shedding bar in the flowing fluid. The vortex sensor 610 senses vortices in a fluid flow 612. The vortex sensor 610 typically comprises a differential pressure sensor, but can also comprise other known types of vortex sensors. The vortex sensor 610 senses fluid flow 612 and provides a vortex sensor output 614. In one aspect, the vortex sensor output 614 comprises a frequency that is proportional to flow rate.

According to one aspect, the vortex flowmeter 602 comprises a first data input 624 that receives first data representing a thermal property of the thermocouple 606. The first data at first data input 624 comprise identification of a thermocouple type associated with the first thermal junction 606. In one aspect, the first data comprises identification of the thermal junction as a type N or type E thermocouple junction.

According to one aspect, the vortex flowmeter 602 also receives a calculation algorithm through input 624. The calculation algorithm is provided to a circuit 648 that stores the calculation algorithm in a memory 649. The calculation algorithm is used to calculate a flow meter output 632 as a function of the vortex sensor output 614 and compensates the flow meter output 632 for temperature as measured by thermocouple 606.

According to one aspect, the vortex flowmeter 602 comprises a pressure data input 634. The pressure data input receives pressure data. The pressure data couples from the pressure data input to the calculation circuit 648. The pressure data represents a pressure of the fluid. The pressure data can be provided by, for example, a pressure sensor.

According to one aspect, a handheld communicator 636 or other device or data source provides the data for at least some of the data inputs. According to another aspect, the handheld communicator comprises a Model 375 Field Communicator from Rosemount Inc. in Eden Prairie, Minn. According to one aspect, the data inputs are communicated digitally on a pair of wires which provide a two-wire process control loop between the handheld communicator and the vortex flowmeter. Another example communication technique uses wireless communication. The vortex flowmeter 602 includes a circuit that calculates temperature T1. The circuit 670 calculates a fluid temperature estimate that is corrected for the thermal property K.

The circuit 648 calculates the flow measurement output 632 compensated for fluid temperature T1. In one aspect, the flow measurement output 632 comprises a volumetric flow output. In another aspect, the flow measurement output 632 comprises a mass flow output. The circuit 648 can be remotely programmed, for example with a handheld communicator to function as either a volumetric flow meter or a mass flow meter.

Figure 7:
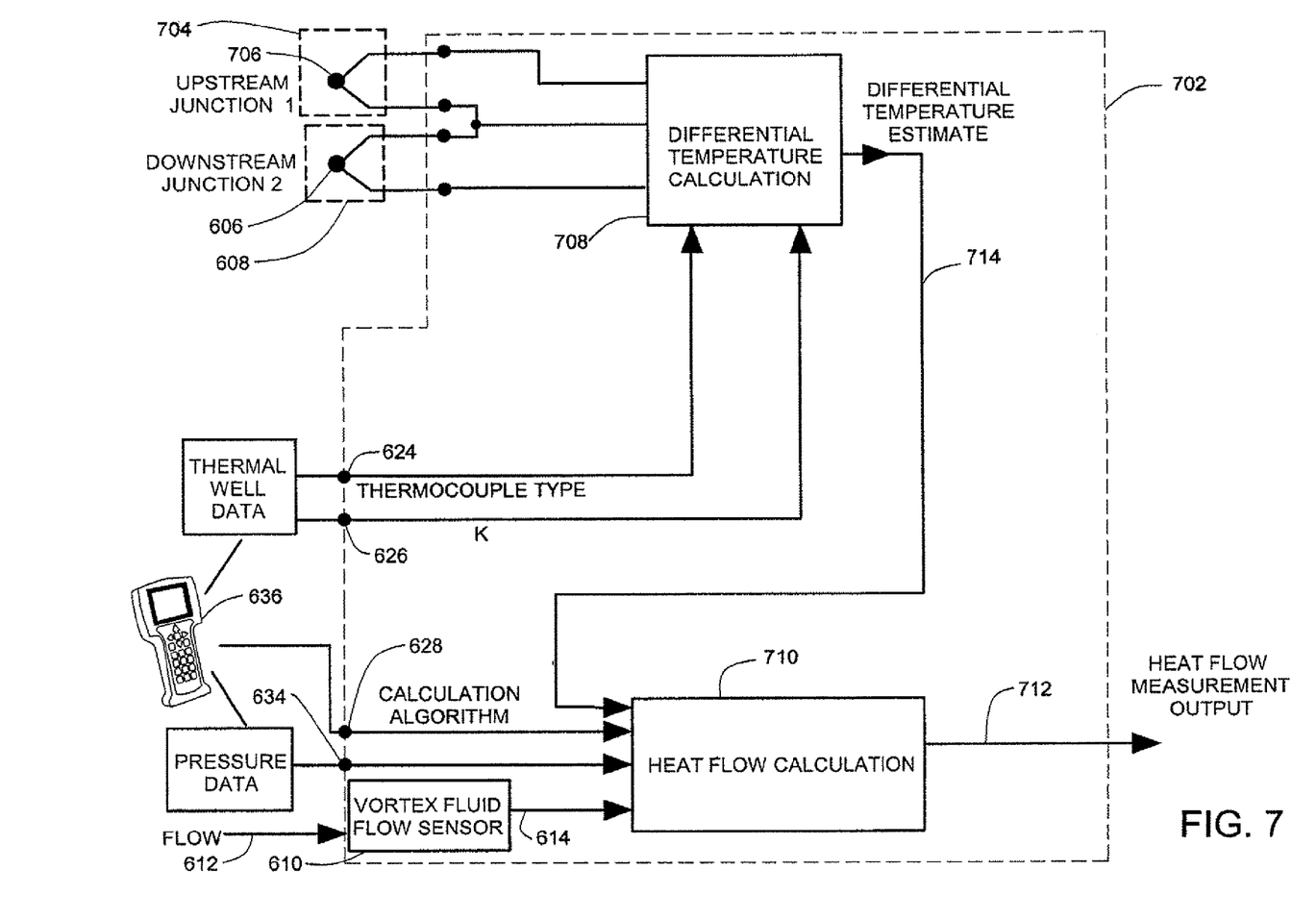
FIG. 7 illustrates a block diagram of a fourth vortex flowmeter with temperature compensation.

FIG. 7 illustrates a block diagram of a vortex flowmeter 702. Many of the elements illustrated in FIG. 7 are similar to or the same as elements illustrated in FIG. 6 and are identified by the same reference numbers. The vortex flowmeter 702 connects to a first thermal junction 606 in a first thermowell 608 and a second thermal junction 706 in a second thermowell 704. The first thermowell 606 is thermally coupled to a fluid in a conduit downstream from an energy exchange process. According to one aspect, the energy exchange process extracts heat from the fluid and cools the fluid. According to another aspect, the energy exchange process provides heat to the fluid and heats the fluid. The second thermowell 704 is thermally coupled to the fluid in a conduit upstream from the energy exchange process. An example arrangement is as described above in connection with FIG. 5. The first thermal junction 606 and the second thermal junction 706 are connected together at the vortex flowmeter 702 to form a thermocouple sensing differential temperature across the energy exchange process.

A differential temperature calculation circuit 708 calculates the differential temperature and provides a differential temperature estimate 714. The differential temperature estimate 714 is a function of thermocouple voltage and data inputs 624 and 626.

A heat flow calculation circuit 710 generates a heat flow measurement output 712 that represents heat flow in the energy exchange process. In one aspect, the heat flow measurement output 712 comprises a rate of heat flow, for example a rate of heat flow in BTU's per hour. In another aspect, the heat flow measurement output 712 is a totalizer output and represents an amount of heat exchanged, for example a total number of BTU's exchanged since resetting the totalized amount. The vortex flowmeter can thus be used as an accountability meter to account for or bill for an amount of heating or cooling used by the energy exchange process.

The heat flow calculation circuit 710 generates the heat flow measurement output 712 as a function of the differential temperature estimate 714 and a vortex sensor output 614 that represents fluid flow. According to one aspect, the heat flow measurement output can also be calculated as a function of pressure data 634. The heat flow calculation is calculated according to a stored calculation algorithm received from the handheld communicator 636. In one example, heat flow is given by mass flow times the change in enthalpy, where mass flow is volumetric flow times density, and density and enthalpy are functions of temperature.

Vortex flowmeters 602, 702 can be realized by use of a processor to perform calculations and generate outputs. A programmable vortex flowmeter can also be realized with a processor that can be programmed to perform the function of vortex flowmeter 602 (which can be either volumetric or mass flow) or the function of vortex flowmeter 702. A single vortex flowmeter product can be programmed in the field by use of the handheld device 636 to provide a volumetric fluid flow output, a mass flow output, or a heat flow output.

Figure 8:
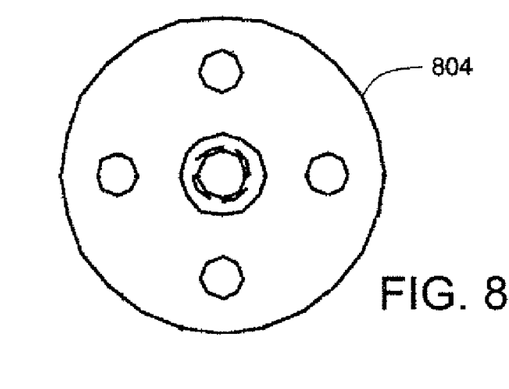
FIGS. 8-13 illustrate thermowells.
Figure 9:
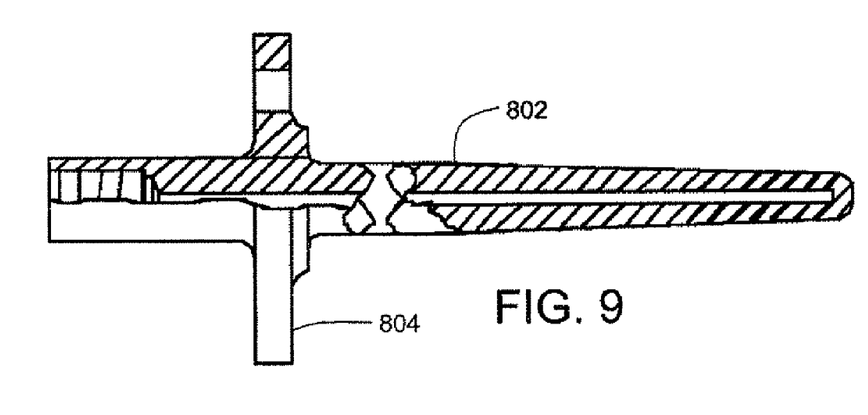
Figures 10, 12:
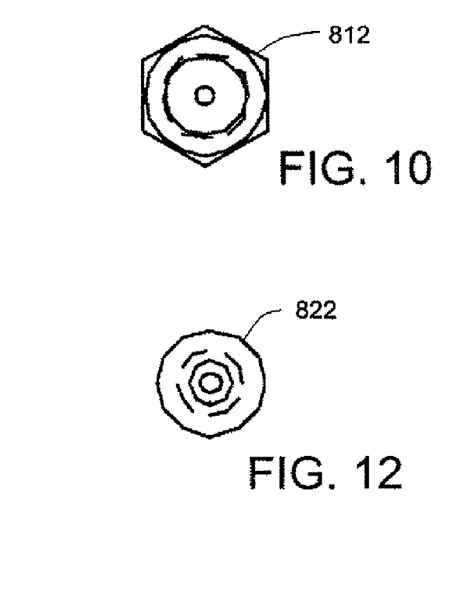
Figure 11:
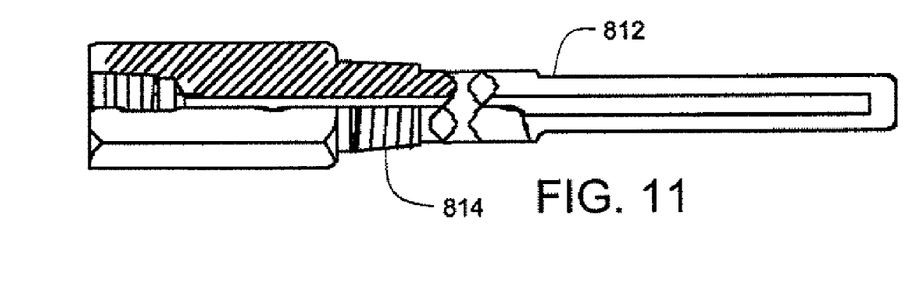
Figure 13:
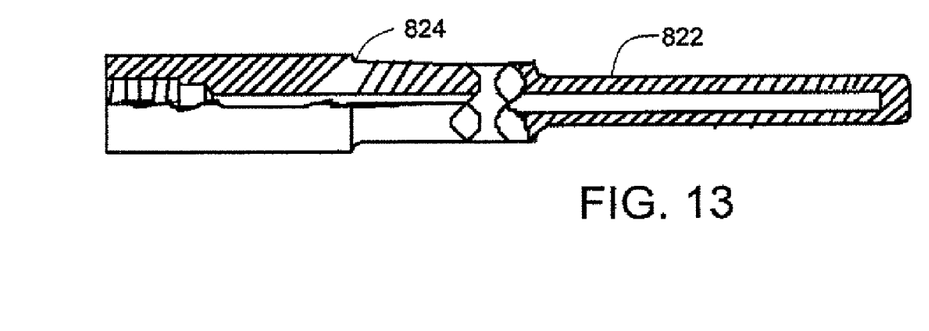

FIGS. 8-9 illustrate an exemplary thermowell 802 that includes a thermowell flange 804 that can be bolted to a pipe flange (not illustrated) on a conduit. FIGS. 10-11 illustrate an exemplary thermowell 812 that includes a threaded collar 814 that can be threaded into a threaded hole (not illustrated) on a conduit FIGS. 12-13 illustrate a thermowell 822 that includes a neck 824 that can be welded to a hole (not illustrated) in a conduit.

Figure 14:
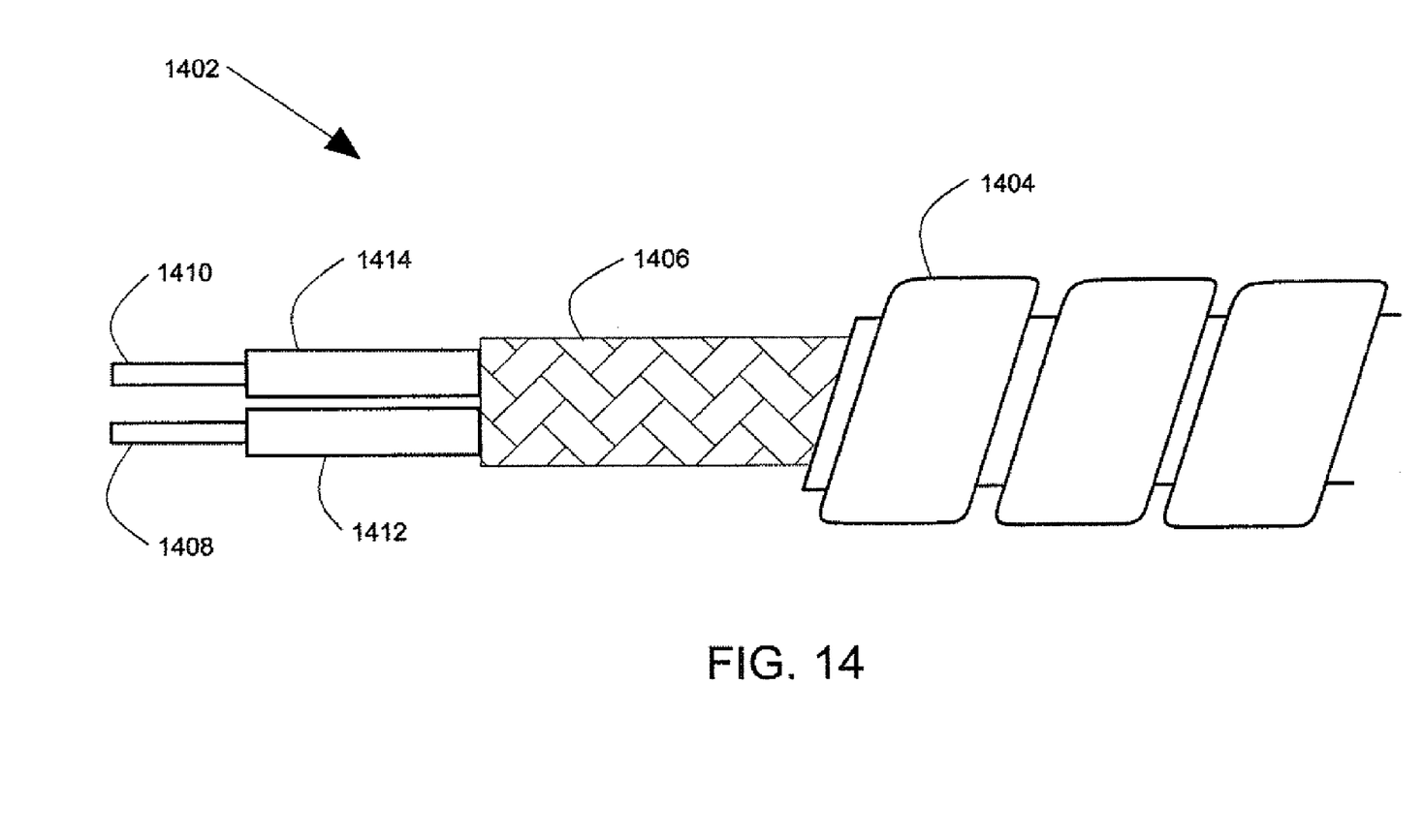
FIG. 14 illustrates a cable for a thermal junction.

FIG. 14 illustrates an example of cable 1402 for use in connecting a thermal junction in a thermal well to terminals on a vortex flowmeter. In FIG. 14, portions of the cable are broken away to show internal construction of the cable. The cable 1402 comprises an outer jacket 1404 that is spirally wound around an outer periphery of the cable. The outer jacket 1404 protects inner layers from mechanical damage due to abrasion or pulling on the cable. A braided metal shield 1406 is provided inside the outer jacket 1404. The braided metal shield 1406 provides electrostatic shielding to reduce EMI pickup by the thermal junction wiring. A pair of conductors 1408, 1410 are provided inside the braided metal shield 1406. The conductors 1408, 1410 are insulated conductors and are surrounded by electrical insulation 1412, 1414. In one aspect, the conductors 1408, 1410 are formed of the metals that are used to form the thermal junction.

Although the present invention has been described with reference to preferred embodiments, workers skilled in the art will recognize that changes may be made in form and detail without departing from the spirit and scope of the invention.

What is claimed is:

1. A vortex flowmeter, comprising:
    a vortex sensor that senses a flow and that provides a vortex sensor output;
    first terminals for receiving a first thermal junction output from a first thermowell assembly that is remote from the vortex flowmeter;
    a data input for receiving data from an external location representing a calculation algorithm information related to a thermal property of the thermowell assembly;
    a memory configured to store the calculation algorithm; and
    a circuit that receives the data, the first thermal junction output and the vortex sensor output, the circuit providing a flowmeter output that is compensated for temperature by the calculation algorithm stored in the memory.

2. The vortex flowmeter of claim 1 wherein the thermal property comprises a thermocouple type.

3. The vortex flowmeter of claim 1 wherein the flowmeter output comprises a mass flow output.

4. The vortex flowmeter of claim 1 wherein the flowmeter output comprises a heat flow measurement output.

5. The vortex flowmeter of claim 4 wherein the heat flow measurement output comprises an accounting of an energy exchange process.

6. The vortex flowmeter of claim 1 wherein the circuit is further configured to receive a second thermal junction output from a second thermowell assembly that is remote from the vortex flowmeter.

7. The vortex flowmeter of claim 6 wherein the flowmeter output comprises a heat flow measurement output.

8. The vortex flowmeter of claim 6 wherein the circuit calculates a difference between temperatures of the first and second thermowell assemblies.

9. The vortex flowmeter of claim 1 further comprising:
a data input coupled to the circuit for receiving data representing a pressure of the fluid.

10. The vortex flowmeter of claim 1 further comprising:
a data input coupled to the circuit for receiving a calculation algorithm information related to a thermal property of the thermowell assembly.

11. The vortex flowmeter of claim 1 wherein the circuit comprises an ambient temperature sensor.

12. A method performing a vortex flow measurement, comprising:
sensing vortices in a flow and providing a vortex sensor output;
positioning a first thermowell assembly in a location that is remote from a vortex flowmeter;
receiving data from an external location representing calculation algorithm;
storing the calculation algorithm in a memory;
receiving a first thermal junction output from the first thermowell assembly; and
providing a flowmeter output based on the vortex sensor output, the flowmeter output being compensated with the calculation algorithm stored in the memory and for the first thermal junction output.

13. The method of claim 12 including providing a mass flow output as the flowmeter output.

14. The method of claim 12 including providing a heat flow measurement output as the flowmeter output.

15. The method of claim 14 including providing the heat flow measurement output as an accounting of an energy exchange process.

16. A flow measurement installation, comprising:
a first thermowell assembly that is mounted to a pipeline;
a vortex flowmeter that is mounted to the pipeline remote from the first thermowell assembly, the vortex flowmeter comprising:
a vortex sensor that senses a flow and that provides a vortex sensor output;
a data input for receiving data from an external location representing a thermal property of the thermowell assembly;
a memory configured to store the information related to calculation algorithm;
first terminals for receiving a first thermal junction output from the first thermowell assembly; and
a circuit that receives the data, the first thermal junction output and the vortex sensor output, the circuit providing a flowmeter output that is compensated for temperature by the calculation algorithm stored in the memory.

17. The flow measurement installation of claim 16 wherein the flowmeter output comprises a mass flow output.

18. The flow measurement installation of claim 16 wherein the flowmeter output comprises a heat flow measurement output.

19. The flow measurement installation of claim 18 wherein the heat flow measurement output comprises an accounting of an energy exchange process.

20. The flow measurement insulation of claim 16 wherein the calculation algorithm comprises a thermal couple type.

21. The method of claim 12 wherein calculation algorithm comprises a thermal couple type.

* * * * *